US009712234B1

United States Patent
Zhang et al.

(10) Patent No.: US 9,712,234 B1
(45) Date of Patent: Jul. 18, 2017

(54) LOCATION AWARE COMMUNICATION SYSTEM USING VISIBLE LIGHT TRANSMISSION

(71) Applicant: Wisconsin Alumni Research Foundation, Madison, WI (US)

(72) Inventors: Xinyu Zhang, Madison, WI (US); Suman Banerjee, Madison, WI (US); Jialiang Zhang, Madison, WI (US); Chi Zhang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/980,103

(22) Filed: Dec. 28, 2015

(51) Int. Cl.
*H04B 10/00* (2013.01)
*H04B 10/116* (2013.01)
*H04W 4/02* (2009.01)

(52) U.S. Cl.
CPC ......... *H04B 10/116* (2013.01); *H04W 4/023* (2013.01); *H04W 4/026* (2013.01)

(58) Field of Classification Search
CPC . H04B 10/116; H04B 10/112; H04B 10/1141; H04B 10/1143; H04B 10/1149; H04B 10/114; H04W 4/026; H04W 4/023
USPC ........ 398/172, 118, 119, 127, 128, 130, 115, 398/126, 129, 131, 33, 192, 193, 194, 398/195, 183; 315/291, 294, 293, 312, 315/158, 307
See application file for complete search history.

(56) References Cited

U.S. PATENT DOCUMENTS

| 8,891,977 | B2 | 11/2014 | Gurovich et al. | |
|---|---|---|---|---|
| 2015/0281905 | A1* | 10/2015 | Breuer | H04W 4/026 398/118 |
| 2015/0372753 | A1* | 12/2015 | Jovicic | H04B 10/116 398/172 |

OTHER PUBLICATIONS

Ye-Sheng Kuc et al.; "Luxapose: Indoor positioning with mobile phones and visible light" In Proceedings of the 20th annual international conference on Mobile computing and networking; pp. 447-458. ACM, Sep. 2014, US.

* cited by examiner

*Primary Examiner* — Hanh Phan
(74) *Attorney, Agent, or Firm* — Boyle Fredrickson, S.C.

(57) ABSTRACT

A visible light communication system identifies the location of a mobile device using light intensities corrected by mobile device orientation. This location can be used to generate a dynamic cluster of visible light transmitters about the mobile device providing improved "handoff" between transmitters and reduced shadowing.

12 Claims, 4 Drawing Sheets

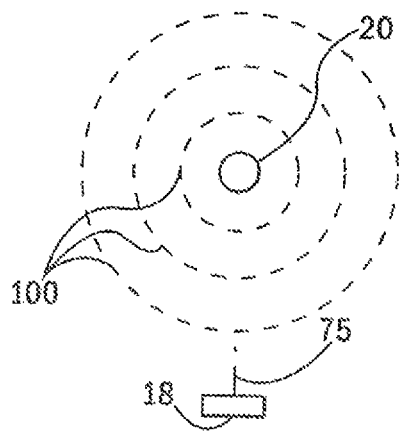
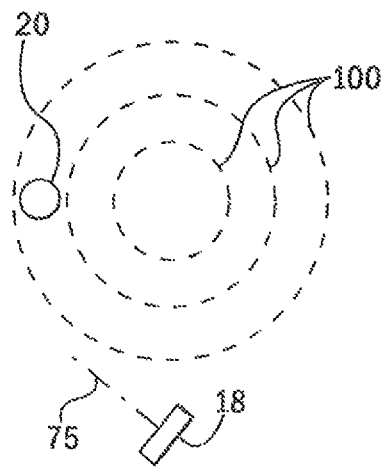
FIG. 5A
FIG. 5B
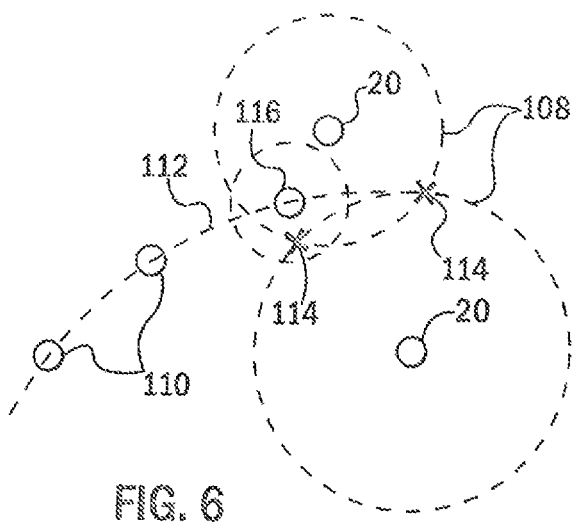
FIG. 6

LOCATION AWARE COMMUNICATION SYSTEM USING VISIBLE LIGHT TRANSMISSION

STATEMENT REGARDING FEDERALLY SPONSORED RESEARCH OR DEVELOPMENT

This invention was made with government support under CNS1318292, CNS1343363, CNS1350039, and CNS1404613 awarded by the National Science Foundation. The government has certain rights in the invention.

CROSS REFERENCE TO RELATED APPLICATION

--

BACKGROUND OF THE INVENTION

The present invention relates to systems for accurately locating mobile devices, and in particular to a system providing location-aware visible light communication.

Increased use of light emitting diodes (LEDs) to provide for the primary environmental lighting in buildings and the like (termed herein "ambient lighting") has raised the possibility of using these lights for data communication. Such data communication systems take advantage of the ability of the LEDs to switch on and off at a high rate of speed imperceptible to human eyes but suitable for communicating data. The IEEE 802.1 5.7 standard has established a basis for visible light communication protocols allowing communication of up to 96 megabits per second.

While such visible light communication is practical for point-to-point communication with a stationary device, ideally, such a system could supplant standard wireless radio communication used for mobile devices such as cell phones and the like. Extending visible light communication to such devices, however, raises a number of problems including sharing bandwidth when multiple users are present and shadowing of the mobile device (for example, by the user's body).

SUMMARY OF THE INVENTION

The present invention provides a system that can determine the location of a mobile device using the light communication signals by analyzing the intensity of the signals from various light fixtures (of known position) adjusted by a measured orientation of the mobile device. This location information may be used to generate dynamic clusters of light fixtures that follow the user with motion of the mobile device, allowing a reduced number of light fixtures to be dedicated to a particular user while reducing shadowing and interruptions during handoff between light fixtures.

The present invention generally provides a system that moves beyond localization using radio waves, which are far less predictable in their falloff with distance, by correcting for the confounding problem of inherent sensitivity of light signal measurement to mobile device orientation.

Specifically, the invention provides a location-aware communication system for mobile devices including a plurality of light transmission units spatially dispersed in an area through which a mobile device may move, the light transmission units outputting a light signal into the area including an identifier for each given light transmission unit; a mobile device and a location server communicating with the mobile device. The mobile device includes a light sensor for receiving light from a set of the light transmission units and processing that light to extract the identifier of the light transmission units of the set and an intensity of the light signal and an orientation sensing system sensing an orientation of the mobile device. The mobile device and location server execute stored programs held in non-transitory medium to: (i) for each given light transmission unit of the set, determine an intensity of the light signal received at the mobile device by the light sensor, (ii) identify at least one possible location of the mobile device with respect to the given light transmission unit of the set based on a relationship between intensity of the light signal and location of the mobile device corrected for orientation of the mobile device; and (iii) use the at least one possible location of the mobile device to determine a single location of the mobile device with respect to the light transmission units of the set.

It is thus a feature of at least one embodiment of the invention to provide a system that allows mobile devices to identify their location without the need for auxiliary location hardware such as radio beacons or the like.

The orientation sensor system may sense roll and/or pitch.

It is thus a feature of at least one embodiment of the invention to make use of common orientation sensors in mobile devices to correct for changes in light sensor sensitivity as the light sensor moves from an optimal vertical orientation.

In addition, the orientation sensor system may sense yaw of the device with respect to a predefined azimuth heading.

It is thus a feature of at least one embodiment of the invention to determine a "compass bearing" direction in which the light sensor is oriented such as preferentially may receive light from certain directions.

The correction of the intensity of the light signal at the mobile device may use predetermined relationships between light dispersion from the given light transmission unit as a function of angle and light sensitivity of the mobile device light sensor unit as a function of angle, and a determination of a degree of alignment between the light transmission unit and the light sensor unit based on the orientation of the mobile device.

It is thus a feature of at least one embodiment of the invention to correct for the primary variability in receive light signal intensity using the known angular gain curves of the light transmitter and light receiver thereby allowing light intensity to be used for localization.

The system may collect possible locations of the mobile device with respect to multiple given light transmission units to determine a single location of the mobile device with respect to the light transmission units of the set. In one example, the system may find an intersection of possible locations determined among different given light transmission units to determine the single location among an intersection of the possible locations.

It is thus a feature of at least one embodiment of the invention to permit a trilateralization type location using multiple light transmitters for improved accuracy and reduced noise influence.

The mobile device may further include at least one movement sensor that may calculate movement since a last determined single location. In this case, the determined single location may be determined by locations deduced by light intensity and the movement since the last determined signal location.

It is thus a feature of at least one embodiment of the invention to augment light intensity-based location sensing with dead reckoning to minimize the number of light sources necessary for localization or to refine that localization.

The light sensor may be a single photosensing element providing an identification of the possible location with respect to the given light transmission unit by receiving a light intensity signal from only a single light sensor.

It is thus a feature of at least one embodiment of the invention to allow localization without the need to provide an imaging system such as a camera or to use camera functionality if it is available.

The location server may communicate with the light transmission units over a network to control the light transmission units, and the single location of the mobile device is used to dynamically define the set of light transmission units to move with the mobile device as the mobile device moves.

It is thus a feature of at least one embodiment of the invention to improve the efficiency of allocating light transmitters to mobile devices by following or anticipating movement of the mobile device with a small set of transmitters.

The light transmission units of the set may be selected to surround the mobile device to reduce shadowing on the mobile device by a mobile device user.

It is thus a feature of at least one embodiment of the invention to provide a mobile experience using visible light communication that better approximates shadow-free performance provided by wireless radio signals.

The network may be a powerline communication network communicating data together with power over power lines communicating with the light transmission units.

It is thus a feature of at least one embodiment of the invention to provide for the benefits of dynamic clustering of light transmitters without requiring extensive infrastructure changes through the use of existing power wiring.

The location server may communicate data to be transmitted synchronously from each of the light transmission units of the set of light transmission units.

It is thus a feature of at least one embodiment of the invention to provide improved signal strength and resistance to shadowing by synchronous transmission through a cluster of light transmitters.

The light signal maybe visible light and the light transmission units may operate to provide ambient light to the area.

It is thus a feature of at least one embodiment of the invention to provide a system that is compatible with the needs for environmental lighting and the distribution of light emitters as is necessary for environmental lighting.

The mobile device and the location device may both further include a wireless transceiver for communicating therebetween and wherein data needed to determine the location of the mobile device is communicated from the mobile device to the location server using the wireless transceivers.

It is thus a feature of at least one embodiment of the invention to provide a system that does not rely on light transmissions from the wireless device requiring capabilities not typically present in portable wireless devices such as cell phones.

These particular objects and advantages may apply to only some embodiments falling within the claims and thus do not define the scope of the invention.

BRIEF DESCRIPTION OF THE DRAWINGS

FIGS. 5a and 5b are simplified top plan views of the expected intensity detection patterns of a given light transmitting unit with respect to two different orientations of the mobile unit, the latter depicted in elevation;

FIG. 6 is a top plan view showing possible locations of the mobile device with respect to two light transmitting units and depicting the determination of a single mobile device location using a combination of possible positions calculated with respect to two light transmitting units and a projected trajectory determined by dead reckoning;

DETAILED DESCRIPTION OF THE PREFERRED EMBODIMENT

Figure 1:
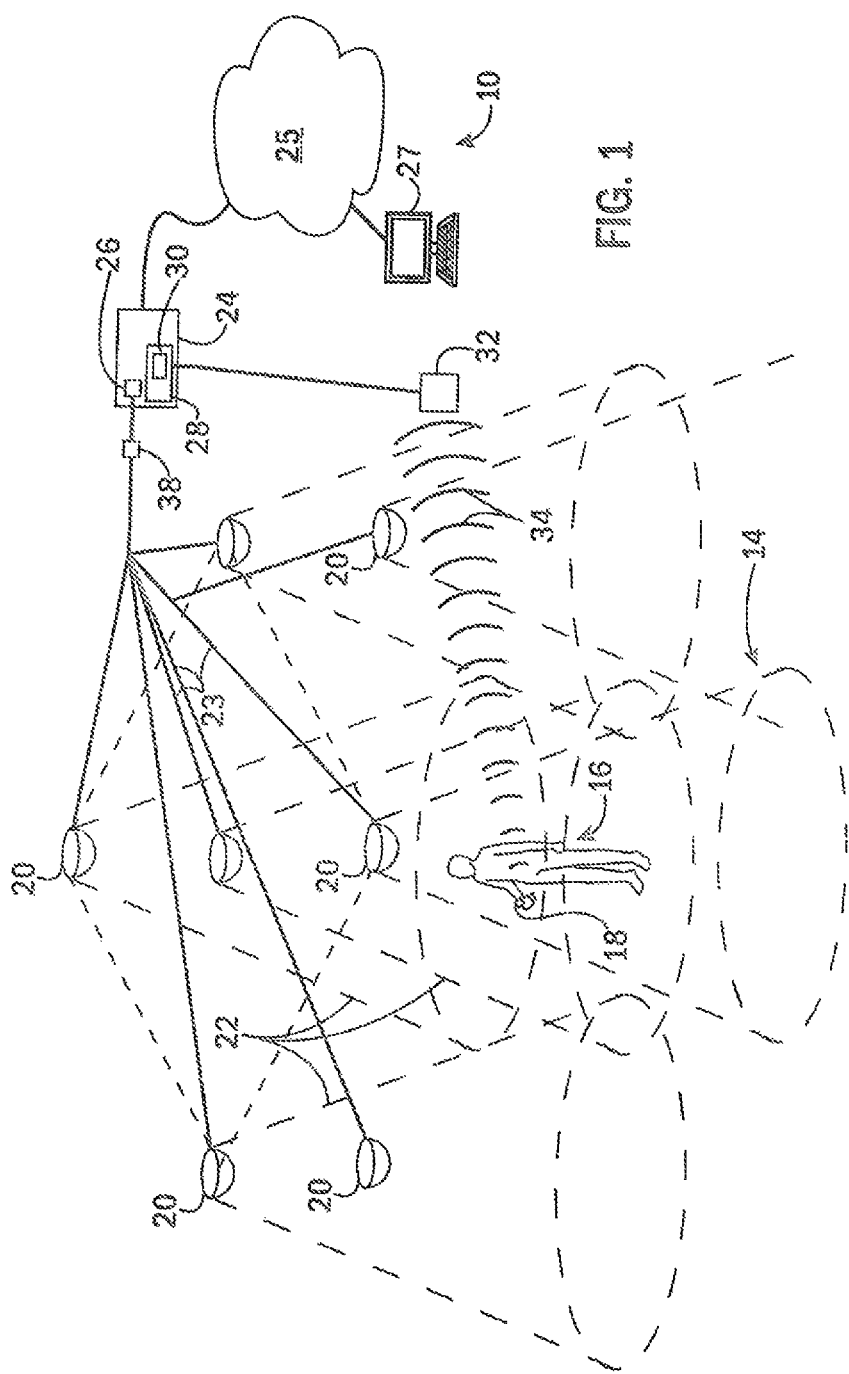
FIG. 1 is a perspective view of a mobile device within an area having multiple light transmission units providing ambient lighting and communicating with a location server and cooperating with the mobile device to locate the mobile device within the area and to provide data to the mobile device.

Referring now to FIG. 1, the present invention may provide for a locator system 10 operating within a volume 12, for example, the interior of a structure such as a store, office building, hospital, airline terminal or the like, having a floor area 14 over which users 16 may move together with the users' wireless devices 18.

Volume 12 may be illuminated, for example, by ceiling mounted luminaires 20, in one example, each projecting a downward cone 22 of visible light to illuminate the floor area 14 as is generally understood in the art. The volumes of the cones 22 will typically overlap for the purpose of providing uniform lighting; however, overlap is not critical to the present invention. The term cone is used generally in this application, it being understood that the shape of the illuminated region for a given luminaire is highly variable and that the boundaries of projected light are generally gradated and indistinct.

Each of the luminaires 20 may communicate data with a location server 24 over a network 23. In one embodiment, the network 23 makes use of power line communication in which communication signals are impressed upon standard power wiring simultaneously used to provide power to the luminaires 20. This powerline communication largely eliminates the need for a separate wiring in the installation of the present invention. Commercial powerline communication transmitter and receiver, following the IEEE 1901 (HomePlug) standard, are already available on the market.

The location server 24 may include a computer processor 26 communicating with a memory 28 holding a stored program and stored data 30 for implementing the invention that will be described below. In one embodiment, the location server 24 may also connect with one or more wireless access points 32 which may communicate via radio waves 34 data between the location server 24 and the mobile devices 18, for example, using the IEEE 802.11 (Wi-Fi) standard. In a principal embodiment, this data is largely one way, passing from the mobile devices 18 to the location server 24 to conserve radio wave bandwidth. The location server 24 may also generally communicate with the Internet 25 and with various terminals 27 providing data to individuals attached thereto as is generally understood in the art.

Figure 2:
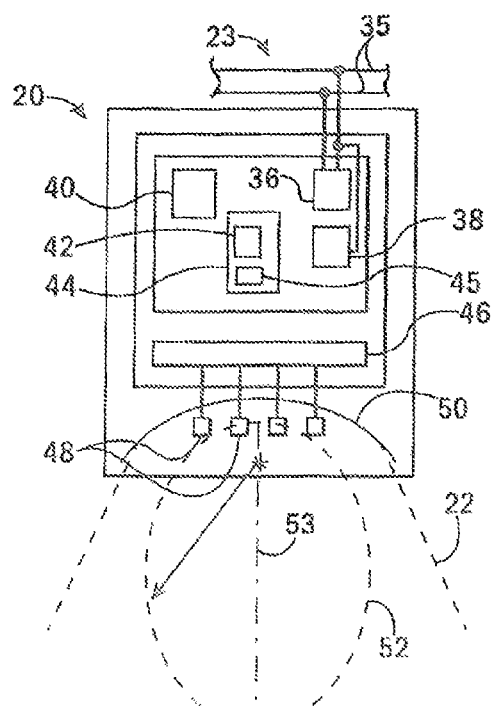
FIG. 2 is a simplified block diagram of each light transmission unit showing the angular dispersion pattern of the light produced by the light transmission unit.

Referring now to FIG. 2, each of the luminaires 20 may connect to powerline 35 which also provides the network 23 using powerline communication as discussed above. The powerline 35 may connect to an internal power regulator 36 for converting high-voltage AC power into power levels suitable for operation of the luminaire 20 and its components and to a communication modulator/demodulator 38 which extracts high-frequency Ethernet protocol information from the same conductors used as the network 23. In this case, a similar modulator/demodulator 38 connects the network 23 to the location server 24.

The modulator/demodulator 38 in each luminaire 20 may provide unidirectional or bidirectional communication between the location server 24 and a processor 40 in the luminaire 20. This latter processor 40 may communicate with a memory 42 holding a program 45 for execution, program instructions, data, and one or more illumination models 44 that will be described below. The program instructions may be used with the stored program and data 30 in the location server 24 and to implement the present invention as will be discussed.

The processor 40 may also communicate with a luminaire power control module 46 providing electrical power (for example, controlled in-current and power) to a bank of light emitting diodes (LED) 48, for example, positioned within a reflector/light shield 50 projecting the downward cone 22. The power control module 46 may provide the desired operating characteristics of the LEDs 48 in producing the desired high average power output commensurate with providing illumination to the area 14 and may also provide for a high-frequency modulation of the LEDs 48 above the flicker rate perceptible to the human eye. As will be understood in the art, the intensity of the light from the LEDs 48 as a function of the angle of the light within the cone 22 (from a center line 53 of the illumination, normally vertically directed) will provide an intensity profile 52 that may be pre-characterized at the factory and stored in a illumination model 44. This intensity profile 52 is dependent on the arrangement and characteristics of the LEDs 48 and the surrounding reflector/light shield 50. The LEDs 48 may be white LEDs employing phosphors or without phosphors but using different colored red, green and blue LEDs for higher modulation speeds.

Figure 3:
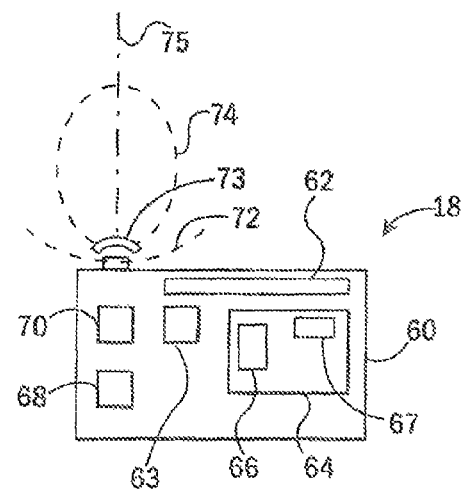
FIG. 3 is a figure similar to that of FIG. 2 showing a block diagram of the mobile device and the angular sensitivity pattern of a light sensor on the mobile device.

Referring now to FIG. 3, the mobile device 18 may be, for example, a standard smart phone, tablet or the like and provides a housing 60 that may be conveniently carried with the user 16 having an exposed display touch surface 62 or the like for providing input and output communication with the user 16. A processor 63 within the mobile device 18 may communicate with an internal memory 64 holding a stored program 67 whose operation in conjunction with other programs discussed below implement the present invention.

Generally, as is understood in the art, the processor 63 may also communicate with a Wi-Fi transceiver 68 allowing communication of data by radio waves 34 with the wireless access points 32 discussed above with FIG. 1. Importantly, the processor 63 also communicates with an orientation sensor systems 70 including but not limited to a three-axis accelerometer, magnetometers and a three-axis gyroscope that serve to provide an indication of the orientation of the housing 60 with respect to gravity and the Earth's magnetic field, as well as providing motion signals (linear and angular accelerations) that allow for inertial-based guidance or dead reckoning to identify the location and orientation of the mobile device 18 for short periods of time through the multiple integration of accelerations into positional changes.

The mobile device 18 may also include a light sensor 72 which may, for example, be a single photodiode or phototransistor or a pixel on a CCD camera device. Notably, the present invention does not require any characterization of the angle of the received light with respect to other light sensors, for example, as would be obtainable through the spatial mapping of a CCD camera with multiple pixels.

The light sensor 72 will nevertheless have an angular sensitivity characteristic 74 indicating its sensitivity at various angles with respect to an axis 75 normal to the detecting surface of the sensor 72. Generally the sensor 72 is fixed relative to the housing 60 and thus the orientation of axis 75 may be deduced using the orientation sensor system 70 discussed above. The sensitivity characteristic 74 may be stored as a model 66 in the memory 64. Desirably, the angular sensitivity characteristic 74 will be substantially uniform over a given angular range of as much as 180 degrees; however, most light sensors 72 provide significant sensitivity variation in as little as 60 degrees. For this reason, a fisheye lens 73 or the like may be placed over the light sensor 72 to decrease angular sensitivity in conjunction with other techniques described herein for managing this angular sensitivity variation.

Figure 7:
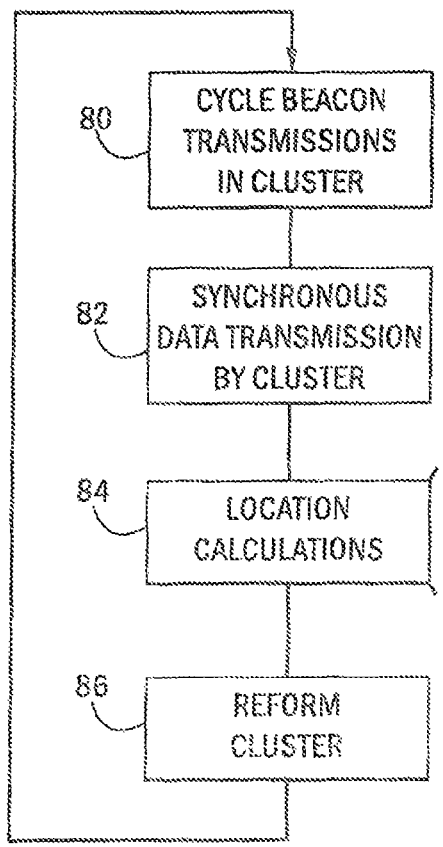
FIG. 7 is a flowchart showing the operation of the light transmitting units under control of a system typically including the location server and at least one mobile device.

Referring now to FIG. 1 and FIG. 7, the location server 24 and the luminaires 20 will cooperate to control the luminaires 20, as indicated by process block 80, to transmit, one at a time from each luminaire 20, a beacon signal providing a luminaire identification code uniquely indicating the identity of a given luminaire 20. This identification code may be transmitted, for example, with the illumination model 44 of the luminaire's distribution pattern 52 or this latter information may be provided only to the location server 24. During this transmission, the light from the other luminaires 20 is held constant or may be momentarily switched off to provide greater signal-to-noise in the transmitted beacon signal.

In between each transmission or periodically with respect to each transmission of process block 80, multiple luminaires 20 of a cluster (whose identity will be described below) may operate synchronously as indicated by process block 82 to transmit data to one or more mobile devices 18. This data, for example, may be streamed audio or video data or any type of data normally desired by the user 16 of the mobile device 18 and will be obtained from the location server 24 over the network 23, for example, as downloaded from the Internet 25.

At process block 84 the location server 24, optionally in conjunction with the mobile device 18 and the luminaires 20, may calculate a location of a given mobile device 18 from data uploaded from the mobile device 18, for example, over the radio link. This process will be described in much greater detail below.

After the location of the mobile device 18 is determined, at process block 86 the cluster of luminaires 20 used for the transmission of data at process block 82 may be reformulated by the location server 24 based on the location data derived at process block 84. After this reformulation, the process of process blocks 80, 82, 84, and 86 may be repeated. It will be appreciated to the extent these devices (the location server 24, luminaires 20 and the mobile device 18) intercommunicate that these tasks of process blocks 80, 82, 84 and 86 may be freely distributed among these devices except as constrained by the need for specialized hardware which will be evident from context.

Figure 4:
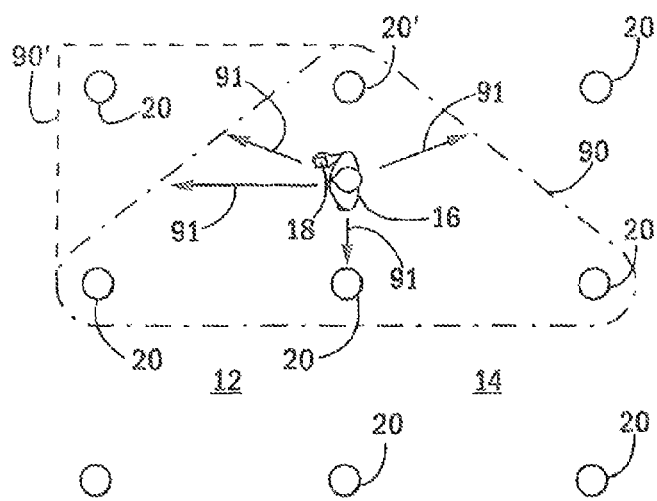
FIG. 4 is a simplified top plan view of the light transmission units of FIG. 3 showing a clustering provided by one embodiment of the invention to select light transmitting units around the location of the mobile device to reduce shadowing and to provide more uniform transitions as the mobile device moves and showing an optional clustering pattern to anticipate that movement.

Referring now to FIG. 4, as noted above with respect to process block 80 and 86, the luminaires 20 are formed into "clusters" 90 for the purpose of communicating with a given mobile device 18. Generally, location data derived at process block 84 will be used to construct a cluster 90 defining a set of luminaires 20 including one luminaire 20' closest to the user 16 and other "scout" luminaires 20 on different sides of the user 16 with respect to the luminaire 20'. The scout luminaires 20 ideally provide overlapping light at the location of the user 16 such as prevents shadows 91 of the user 16 from falling on the mobile device 18 for all luminaires 20 in the cluster 90. As the mobile device 18 moves in the area 14, the luminaires 20 within the cluster 90 are changed so that the center of mass of the cluster (being the weighted distance between the mobile device 18 and each luminaire 20 weighted according to its light output) follows the user 16. This approach will generally surround the user 16 with luminaires 20. As will be discussed below, tracking the location of the mobile device 18 allows a trajectory of the device 18 to be determined such as may permit a predicted trajectory 93 of the device 18 to be determined. The center of mass of the cluster 90 may be shifted from the device 18 to a point along the predicted trajectory 93 in order to anticipate movement of the mobile device 18 and to accommodate assumptions about the mobile device 18 being in front of the user 16 as the user 16 moves. The amount of shifting may, for example, be proportional to the speed of movement of the user 16 and may anticipate movement in the orientation of the mobile device 18 as well. The size of the cluster 90 may be increased, for example, by adding frontward cluster areas 90' to the cluster 90 addressing the greater probability of user 16 movement into these forward areas over time and may be skewed along the predicted trajectory 93 depending on the anticipated or current orientation of the mobile device 18.

The number of luminaires 20 in the cluster 90 may be dynamically changed depending on bandwidth demands by a given mobile device but will generally be far fewer than all of the luminaires 20 and may be practically limited to the region just around the user 16.

Determining the set of luminaires 20 in the cluster 90 may be done by using a pre-prepared map linking luminaire identifiers (and hence luminaires 20) to particular locations in the volume 12 that can be matched to the location of the mobile device. This map may be held, for example, as data in the location server 24 and may be generated either empirically by moving a photosensor with a constant orientation through the area 14 or by mathematical modeling using the known illumination models 44 and measured positions of the luminaires 20. Initially, when the mobile device 18 arrives in the area 14, for example, as detected by radio waves 34 (for example, a Wi-Fi beacon signal) from the mobile device 18, the cluster 90 may be arbitrarily large to accommodate the fact that the location of the mobile device 18 is not yet been determined. Once the location is determined, the size of the cluster may be reduced. Alternatively, predetermined clusters 90 may be located at entrances to the area 14 with the expectation that they will capture new users 16.

Figure 8:
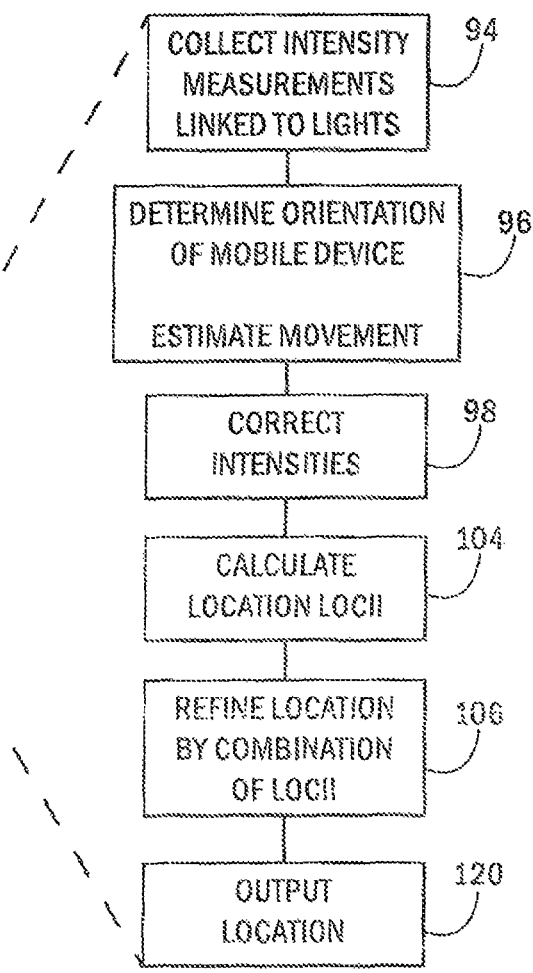
FIG. 8 is a detailed flowchart of the calculation of location.

Referring now to FIG. 8, the process of identifying the location of the user 16 and the mobile device 18 may begin as indicated by process block 94 by collecting intensity information at the mobile device 18 indicating the light intensity detected by the mobile device 18 from particular luminaires 20. This intensity information is collected through the light sensor 72 (shown in FIG. 3) and will generally not include any identification of the orientation of the received light but will simply be a list of light intensities and identifications of associated luminaries 20.

At process block 96 the orientation of the mobile device 18 is determined, for example, using the sensor system 70 as described above. This orientation generally determines how vertical axis 75 is (altitude) and, to the extent that the axis 75 is not vertical, in what direction it is tipping (azimuth). Altitude can be determined from a three-axis accelerometer providing an indication of the dominant acceleration of gravity along an x-axis (roll) and y-axis (pitch) of the housing of the portable device 18. In the case of a smart phone or the like where the light sensor 72 is on a front face of the phone that also provides the touch sensing display, the x-axis will generally be oriented along the long dimension (height) of the housing parallel to the display and y-axis will also be parallel to the display but perpendicular to the x-axis. The azimuth (yaw) will generally be measured about a z-axis perpendicular to the x-axis and y-axis and parallel to the axis 75 using the magnetometer, when possible, augmented by rotational motion sensing by the internal gyroscopes extrapolating from previously determined yaw orientations.

Once the orientation of the mobile device 18 is established, an estimate of the location of the mobile device 18 may be determined by a variety of methods. One embodiment of the present invention contemplates that location will be deduced by the intensity of the light from different luminaires 20 of known position. The raw intensity received by the light sensor 72, however, will normally not yield an accurate location because of the confounding effect of the orientation of the mobile device 18 on those intensities. That is, the intensity of light from a given luminaire 20 will vary significantly depending on the orientation of the mobile device 18 as either facing toward or away from that luminaire 20. Accordingly, at process block 98, information conveyed by the intensities and known locations of the associated luminaires 20 is corrected by the information of orientation available from process block 96.

Referring momentarily to FIGS. 5a and 5b, a given luminaire 20 may have a well-described illumination pattern described by the illumination model 44 associated with the luminaire 20 and as represented in FIG. 5 by the intensity iso-curves 100, each following a path of constant intensity of received light. For a conical light pattern, the iso-curves 100 will generally be concentric circles about the location of the luminaire 20. The actual light detected by the mobile device 18 will depend on its orientation, however, so that when the mobile device 18 is oriented so that axis 75 is substantially vertical, a given intensity reading associated with the luminaire 20 will place the mobile device 18 on one of the iso-curves 100 based on the received intensity weighted by the sensitivity characteristic 74 of the mobile device 18. This iso-curve 100 describes a locus of possible location points.

As shown in FIG. 5b, however, if the mobile device 18 is tipped such that axis 75 has an altitude of, say, 45 degrees (toward the left as shown in FIG. 5b), the effective iso-curves 100 as detected by the mobile device 18 will shift rightward with respect to the location of the luminaire 20 as a result of the preferential sensitivity of the mobile device 18 in the left direction. The exact amount of shifting will depend on the curve 74 which will also tend to distort the iso-curves 100.

Based on this observation, knowledge of the orientation of the mobile device 18 derived at process block 96 may correct the received intensity information, for example, by adjusting the expected modeled iso-curves 100 associated with each luminaire 20. This modification may, for example, consider hypothetical placement of the mobile device 18 over the area of the iso-curves 100 modifying the value of the iso-curves 100 by the degree of alignment of axis 75 of the mobile device 18 and a straight line path between the luminaire 20 and the mobile device 18. The more these two axes deviate, the more the intensity of the iso-curves 100 is decreased. These modified iso-curves may then be used to determine a locus of possible locations of the mobile device 18 with respect to each luminaire 20.

It will be appreciated that an additional intensity effect will also occur if the elevation of the mobile device 18 is changed; however, these elevational effects will generally be small given the range of heights of most users 16 and may be corrected over the course of time by monitoring maximum intensity as the user 16 moves through the volume 12 which will give an idea of the user's height.

Referring now to FIGS. 6 and 8, various loci of possible locations for different luminaires 20 are then reconciled at process block 106 by one of several means. If two or more luminaire 20 provide adequate signal strength to each to develop a locus 108 of possible positions, their intersections may be used to narrow the locus to two points (in the case of two luminaires 20 or a single-point in the case of three or more luminaires 20). Looking at the case of one or two luminaires 20, where intersection of loci 108 do not define a single location point but rather multiple points 114, an estimated single location point may be obtained at process block 96, for example, from previously identified locations 110 (using the techniques described herein) by selecting the closest point 114 from the intersection of loci 108 to that point. Preferably, however, a dead reckoning of new position estimation 112 of the mobile device 18 will be calculated from a last identified location of the mobile device 18, and the movement since that time determined from elapsed time and acceleration of the mobile device will be measured by the sensor system 70. The intersection of this new position estimation 112, which may be, for example, a portion of a trajectory, with the multiple points 114 may then provide for a single identified location 116.

Other location estimates may be used to resolve a single identified location 116 in the event that the intensity of light from three or more luminaires 20 cannot be determined. For example, a location estimate based on a GPS signal, wireless triangulation, or local near field beacons may be used. Mismatch between various location measures that may not perfectly intersect can be averaged to provide a single identified location 116. Present experiments by the inventors indicate that resolution of less than 0.5 meters can readily be obtained.

Referring again to FIG. 8, as indicated by process block 120, this single location value 116 may be output, for example, to other programs, that may use the location of the mobile device 18 to provide location-based content to the user 16, for example, information about the user's location, points of interest, promotions in a particular part of a store or retail environment. The location value 116 may also be provided to the server 24 to be transmitted to others, for example, in hospitals or airports where this location information may be provided to individuals who need to find critical personnel quickly.

In addition, this location information may be used at process block 86 to reform the cluster 90 as discussed above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A location-aware communication system for mobile devices comprising:
   (a) a plurality of light transmission units spatially dispersed in an area through which a mobile device may move, the light transmission units outputting a light signal into the area including an identifier for each given light transmission unit;
   (b) a mobile device including:
      (i) a light sensor for receiving light from a set of the light transmission units and processing that light to extract the identifier of the light transmission units of the set and an intensity of the light signal;
(ii) an orientation sensing system sensing an orientation of the mobile device; and
(c) a location server communicating with the mobile device;
wherein the mobile device and location server execute stored programs held in non-transitory medium to:
(i) for each given light transmission unit of the set, determine an intensity of the light signal received at the mobile device by the light sensor,
(ii) identify at least one possible location of the mobile device with respect to the given light transmission unit of the set based on a relationship between intensity of the light signal and location of the mobile device corrected for orientation of the mobile device;
(iii) use the at least one possible location of the mobile device to determine a single location of the mobile device with respect to the light transmission units of the set;
wherein the orientation sensing system includes a sensor sensing at least one of roll and pitch of the mobile device with respect to gravity,
wherein the orientation sensing system includes sensors sensing yaw of the device with respect to a predefined azimuth heading,
wherein the correction of the intensity of the light signal at the mobile device uses predetermined relationships between light dispersion from the given light transmission unit as a function of angle and light sensitivity of the mobile device's light sensor unit as a function of angle and a determination of a degree of alignment between the light transmission unit and the light sensor unit based on the orientation of the mobile device.

2. The location-aware system of claim 1 wherein step (iii) uses the at least one possible location of the mobile device for multiple given light transmission units to determine a single location of the mobile device with respect to the light transmission units of the set.

3. The location-aware system of claim 1 wherein step (iii) finds an intersection of possible locations determined among different given light transmission units to determine the single location among an intersection of the possible locations.

4. The location-aware system of claim 1 wherein the mobile device further includes at least one movement sensor and wherein step (iii) calculates movement since a last determined single location and wherein step (iii) determines the single location by combining the at least one possible location and the movement since the last determined signal location.

5. The location-aware system of claim 4 wherein step (iii) finds an intersection of possible locations determined among different given light transmission units to determine the single location among an intersection of the possible locations.

6. The location-aware system of claim 1 wherein the light sensor is a single photosensing element providing an identification of the at least one possible location with respect to the given light transmission unit to receive a light intensity signal from only a single light sensor.

7. The location-aware system of claim 1 wherein the light signal is visible light and the light transmission units operate to provide ambient light to the area.

8. The location-aware system of claim 1 wherein the mobile device and the location server both further include a wireless transceiver for communicating therebetween and wherein data needed to determine the location of the mobile device is communicated from the mobile device to the location server using the wireless transceivers.

9. A location-aware communication system for mobile devices comprising:
(a) a plurality of light transmission units spatially dispersed in an area through which a mobile device may move, the light transmission units outputting a light signal into the area including an identifier for each given light transmission unit;
(b) a mobile device including:
(i) a light sensor for receiving light from a set of the light transmission units and processing that light to extract the identifier of the light transmission units of the set and an intensity of the light signal;
(ii) an orientation sensing system sensing an orientation of the mobile device; and
(c) a location server communicating with the mobile device;
wherein the mobile device and location server execute stored programs held in non-transitory medium to:
(i) for each given light transmission unit of the set, determine an intensity of the light signal received at the mobile device by the light sensor;
(ii) identify at least one possible location of the mobile device with respect to the given light transmission unit of the set based on a relationship between intensity of the light signal and location of the mobile device corrected for orientation of the mobile device;
(iii) use the at least one possible location of the mobile device to determine a single location of the mobile device with respect to the light transmission units of the set,
wherein the location server communicates with the light transmission units over a network to control the light transmission units and the single location of the mobile device is used to dynamically define the set of light transmission units to move with the mobile device as the mobile device moves.

10. The location-aware system of claim 9 wherein the selected light transmission units of the set of light transmission units are selected to surround the mobile device to reduce shadowing on the mobile device by a mobile device user.

11. The location-aware system of claim 9 wherein the network is a powerline communication network communicating data together with power over power lines communicating with the light transmission units.

12. The location-aware system of claim 9 wherein the location server further communicates data to be transmitted synchronously from each of the light transmission units of the set of light transmission units.

* * * * *